United States Patent [19]

Exner et al.

[11] Patent Number: 4,468,361

[45] Date of Patent: Aug. 28, 1984

[54] PROCESS FOR IMPARTING SURFACE-STRUCTURES TO WOOD-CEMENT BOARDS

[75] Inventors: Günter Exner, Dettelbach; Karlheinz Mönkeberg, Hanover, both of Fed. Rep. of Germany

[73] Assignee: Fulgurit GmbH & Co. Kommanditgesellschaft, Wunstorf, Fed. Rep. of Germany

[21] Appl. No.: 409,141

[22] Filed: Aug. 18, 1982

[30] Foreign Application Priority Data

Aug. 27, 1981 [DE] Fed. Rep. of Germany ....... 3133836

[51] Int. Cl.$^3$ .............................................. B29J 5/04

[52] U.S. Cl. .................................... 264/119; 264/293

[58] Field of Search ............... 264/293, 119, 123, 284, 264/107, 76, 280, 109

[56] References Cited

U.S. PATENT DOCUMENTS

| | | | |
|---|---|---|---|
| 1,634,462 | 7/1927 | Mallauer | 264/119 |
| 2,171,155 | 8/1939 | Wright | 264/284 |
| 2,531,016 | 11/1950 | Waechter | 264/119 |
| 3,271,492 | 9/1966 | Elmendorf | 264/123 |

*Primary Examiner*—James B. Lowe

*Attorney, Agent, or Firm*—Wells & Wells

[57] ABSTRACT

A process is created for incorporating surface structures into wood-cement boards which are pressed during cement hardening in a batch press and then are kept in clamping apparatus in the pressed state for a substantial length of time.

In the invention the wood-cement boards freed from their plates and after their storage in the clamping apparatus are fed to a calendering system of which the calendering rolls are provided with a surface structure, the wood-cement boards moving between the calender rolls and being provided by these with surface structures on one or on both sides.

6 Claims, 1 Drawing Figure

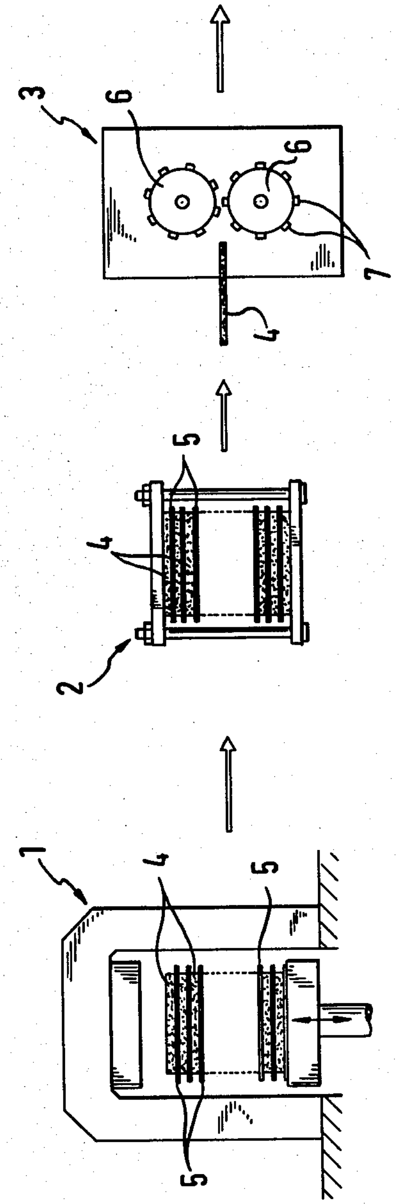
1
2
3
4
5
6
7

PROCESS FOR IMPARTING SURFACE-STRUCTURES TO WOOD-CEMENT BOARDS

BACKGROUND OF THE INVENTION

The present invention concerns a process for imparting surface structures to wood-cement boards which during the cement hardening are pressed in a batch-press and then are kept in a clamping apparatus in the pressed state for a substantial length of time until the cement has hardened so that swelling of the wood fibers no longer is possible.

It is known in the prior art manufacture of asbestos-cement boards to provide the oiled partition plates of a press stack with surface structures which are transferred to the boards during pressing. Contrary to the case for wood-cement boards, asbestos-cement boards however can be stored in the unclamped state directly after pressing because swelling or other deformations cannot take place due to the nature of this material.

If the prior art process used for asbestos-cement boards were to be applied to wood-cement boards, the structured plates would have to remain during the entire clamping time within the clamped stack until hardening of the cement. As a result an extraordinarily large number of structured partition plates is required for manufacturing on a substantial scale, such structuring therefore requiring inadmissible costs for its implementation, the more so that structured plates of the cited kind can only be manufactured at appreciable expense.

It is further known from the manufacture of asbestos-cement boards to impart the structure using calendering rolls of which the surface is suitably profiled, the asbestos-cement boards being made to pass in their fresh state between the calender rolls. However this is possible only where subsequent pressing is not needed, as might be the case for certain asbestos-cement boards. As regards wood-cement boards on the other hand, pressing must be performed, as without it the required strength of these boards cannot be obtained. In the course of such pressing therefore a structure applied in the fresh state would be forced out again.

SUMMARY OF THE INVENTION

It is therefore the object of the present application to create a process of the initially cited type making it possible to impart in simple and economical manner a surface structure to wood-cement boards.

This problem is solved by the present invention in that after the storage into the clamping apparatus, the wood-cement boards free of plates are fed to a calendering system of which the calendering rolls are provided with a surface structure and in that the wood-cement boards are made to pass between the calendering rolls which provide them with surface structures on one or on both sides.

Now it was surprisingly found that when using calendering rolls, it is possible in spite of the prior solidification to impart a surface-structure into the surface of the wood-cement boards, where said surface-structure under some circumstances even may assume macroscopic dimensions. A surface-structure of this order of magnitude cannot be economically obtained by areal pressing.

Appropriately the calendering rolls should impart the surface-structures directly after unclamping; it has been found however that depending on the kind and composition of the wood-cement boards, interim storages up to two hours approximately also are possible.

BRIEF DESCRIPTION OF THE DRAWING

The invention is discussed below in closer detail in relation to an illustrative embodiment shown in the schematic flow diagram shown in the drawing.

DESCRIPTION OF THE PREFERRED EMBODIMENT

The FIGURE schematically shows a batch press 1, a clamping apparatus 2 and a calendering system 3. The wood-cement boards 4 are pressed with inserted partition plates 5 in the batch press 1 and then are kept for a substantial length of time, preferably several hours, by the clamping apparatus 2 in the pressed state. The moment the binder, namely the cement, has hardened, swelling of the wood fibers no longer is possible but the cement is fresh enough to accept a surface structure the wood-cement boards 4 are unclamped and removed from the clamping apparatus 2 to be fed to the calendering system 3. This calendering system 3 preferably includes two calendering rolls 6 between which the individual boards 4 are made to pass. Either or both of the calendering rolls 6 are provided with the surface structures 7 shown in exaggerated form in the FIGURE and which are transferred to the surfaces of the wood-cement boards 4 when they pass through these rolls 6.

The individual wood-cement boards 4 are appropriately fed to the calendering system 3 directly after the boards have been removed from the clamping apparatus 2, but depending on circumstance, interim storage of the boards after removal from the clamping apparatus may last up to about two hours.

We claim:

1. In a process for imparting surface structures to wood-cement boards comprising pressing said boards during the hardening of the cement in a batch press and maintaining said boards in the pressed state in clamping apparatus for a sufficient length of time that said cement has hardened and swelling of the wood fibers no longer is possible, the improvement comprising:

freeing said wood-cement boards from said clamping apparatus while said cement is fresh enough to accept a surface structure and feeding said boards to a calendering system having two calendering rolls with at least one of said rolls having a surface structure.

2. The process of claim 1, wherein both of said calendering rolls have surface structures.

3. The process of claim 1, wherein said surface structures are imparted by the calendering rolls directly after unclamping.

4. The process of claim 2, wherein said surface structures are imparted by the calendering rolls directly after unclamping.

5. The process of claim 1, wherein said surface structures are imparted by the calendering rolls after an interim storage of up to about two hours following the unclamping.

6. The process of claim 2, wherein said surface structures are imparted by the calendering rolls after an interim storage of up to about two hours following the unclamping.

* * * * *